(12) United States Patent
Imoto et al.

(10) Patent No.: US 10,809,068 B2
(45) Date of Patent: Oct. 20, 2020

(54) ORIENTATION IDENTIFICATION METHOD AND RECORDING MEDIUM

(71) Applicant: Panasonic Intellectual Property Corporation of America, Torrance, CA (US)

(72) Inventors: Junichi Imoto, Osaka (JP); Yukie Shoda, Osaka (JP); Toru Tanigawa, Osaka (JP); Yusuke Tsukamoto, Osaka (JP); Seiya Imomoto, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 3 days.

(21) Appl. No.: 16/222,212

(22) Filed: Dec. 17, 2018

(65) Prior Publication Data

US 2019/0195636 A1    Jun. 27, 2019

Related U.S. Application Data

(60) Provisional application No. 62/608,913, filed on Dec. 21, 2017.

(30) Foreign Application Priority Data

Aug. 10, 2018   (JP) .................................. 2018-151801

(51) Int. Cl.
*G01C 21/26* (2006.01)
*G01C 21/12* (2006.01)
*G01C 21/16* (2006.01)

(52) U.S. Cl.
CPC ............. *G01C 21/26* (2013.01); *G01C 21/12* (2013.01); *G01C 21/16* (2013.01)

(58) Field of Classification Search
CPC .............................. G01C 21/12; G01C 21/26
See application file for complete search history.

(56) References Cited

U.S. PATENT DOCUMENTS

| 6,130,706 A * | 10/2000 | Hart, Jr. .................. B60T 8/172 |
| | | 348/148 |
| 7,891,103 B2 * | 2/2011 | Mayor ................... G01C 17/38 |
| | | 33/356 |
| 9,448,250 B2 * | 9/2016 | Pham ...................... G01C 17/38 |
| 10,168,156 B2 * | 1/2019 | Bryant ................... G01C 21/16 |

(Continued)

FOREIGN PATENT DOCUMENTS

JP        2017-125768        7/2017

*Primary Examiner* — Babar Sarwar
(74) *Attorney, Agent, or Firm* — Wenderoth, Lind & Ponack, L.L.P.

(57) ABSTRACT

An orientation identification method for identifying an orientation of a device installed by being mounted on a moving body includes: obtaining a certain amount of acceleration in three mutually orthogonal directions detected by an acceleration sensor included in the device; and identifying the orientation of the device expressed in a coordinate system from acceleration data indicating the certain amount of acceleration obtained in the obtaining, according to movement characteristics indicated by statistics of acceleration during movement of the moving body expressed in the coordinate system, the coordinate system including a gravitational acceleration direction as an axis.

12 Claims, 15 Drawing Sheets

(56) References Cited

U.S. PATENT DOCUMENTS

| | | | |
|---|---|---|---|
| 2007/0156315 A1* | 7/2007 | Raab | B60T 8/17551 |
| | | | 701/38 |
| 2012/0048014 A1* | 3/2012 | Loomis | B60R 11/0258 |
| | | | 73/384 |
| 2012/0173140 A1* | 7/2012 | Czompo | G01S 19/47 |
| | | | 701/472 |
| 2013/0060467 A1* | 3/2013 | Nash | G01C 21/12 |
| | | | 701/500 |
| 2014/0361763 A1* | 12/2014 | Chow | G01C 17/38 |
| | | | 324/202 |
| 2015/0006099 A1* | 1/2015 | Pham | G01C 21/26 |
| | | | 702/93 |
| 2015/0341436 A1* | 11/2015 | Choi | H04L 67/02 |
| | | | 709/203 |
| 2015/0354951 A1* | 12/2015 | Ali | G01C 21/16 |
| | | | 702/141 |
| 2016/0044575 A1* | 2/2016 | Rajeevalochana | H04W 8/245 |
| | | | 455/410 |
| 2016/0116292 A1* | 4/2016 | An | H04W 4/024 |
| | | | 70/454 |
| 2017/0160088 A1* | 6/2017 | Azami | G01C 21/34 |
| 2017/0164315 A1* | 6/2017 | Smith | H04W 4/029 |
| 2019/0293432 A1* | 9/2019 | Demiral | B62D 15/021 |

\* cited by examiner

ORIENTATION IDENTIFICATION METHOD AND RECORDING MEDIUM

CROSS REFERENCE TO RELATED APPLICATION

This application claims the benefit of priority of U.S. Provisional Patent Application No. 62/608,913 filed on Dec. 21, 2017, and the benefit of priority of Japanese Patent Application Number 2018-151801 filed on Aug. 10, 2018, the entire contents of which are hereby incorporated by reference.

BACKGROUND

1. Technical Field

The present disclosure relates to orientation identification methods and recording media, and in particular to an orientation identification method and a recording medium for use in a device installed by being mounted on a moving body.

2. Description of the Related Art

Data are increasingly used that are obtained by mobile terminals, such as smart phones mounted on vehicles. However, some of the data obtained by such mobile terminals, such as acceleration data or angular velocity data, have output values that vary in accordance with mounting orientations. It is necessary to determine mounting orientations in order to effectively use data having output values that vary in accordance with the mounting orientations.

For example, Patent Literature (PTL) 1 (Japanese Unexamined Patent Application Publication No. 2017-125768) discloses a technique for accurately calculating acceleration of a vehicle from detection values of an acceleration sensor included in a mobile terminal in consideration of a change in inclination angle of the mobile terminal.

SUMMARY

However, the technique disclosed in PTL 1 considers the change in inclination angle of the mobile terminal using road grade information obtained from map information etc. or an azimuth obtained by a magnetic sensor etc. In other words, the technique disclosed in PTL 1 requires information other than the detection values of the acceleration sensor included in the mobile terminal.

In view of the above circumstance, the present disclosure has an object to provide an orientation identification method and a recording medium that can identify an orientation of a device mounted on a moving body, using only acceleration data detected by an acceleration sensor included in the device.

In order to solve the above problem, an orientation identification method according to one aspect of the present disclosure is an orientation identification method for identifying an orientation of a device installed by being mounted on a moving body that includes: obtaining a certain amount of acceleration in three mutually orthogonal directions detected by an acceleration sensor included in the device; and identifying the orientation of the device expressed in a coordinate system from acceleration data indicating the certain amount of acceleration obtained in the obtaining, according to movement characteristics indicated by statistics of acceleration during movement of the moving body expressed in the coordinate system, the coordinate system including a gravitational acceleration direction as an axis.

It should be noted that these or specific aspects may be realized by a device, a system, an integrated circuit, a computer program, or a computer-readable recording medium, such as a CD-ROM, and may be realized by any combination of a system, a method, an integrated circuit, a computer program, and a recording medium.

According to the orientation identification method etc. of the present disclosure, an orientation of a device mounted on a moving body can be identified using only acceleration data detected by an acceleration sensor included in the device.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
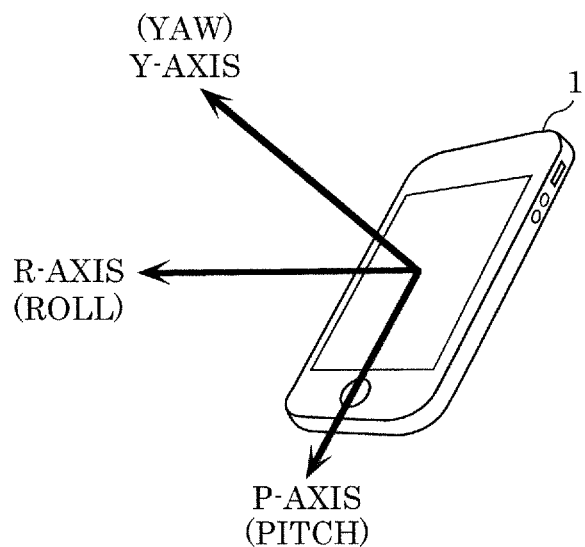
FIG. 1 is a diagram illustrating an example of a device in an embodiment.

The orientation identification method according to one aspect of the present disclosure includes: obtaining a certain amount of acceleration in three mutually orthogonal directions detected by an acceleration sensor included in the device; and identifying the orientation of the device expressed in a coordinate system from acceleration data indicating the certain amount of acceleration obtained in the obtaining, according to movement characteristics indicated by statistics of acceleration during movement of the moving body expressed in the coordinate system, the coordinate system including a gravitational acceleration direction as an axis.

With this, it is possible to identify the orientation of the device using only the acceleration data obtained by the acceleration sensor included in the moving body.

Moreover, for example, the moving body is a wheeled vehicle, and the movement characteristics indicate that a movement in a state in which a downward direction of an up-down direction of the moving body is the gravitational acceleration direction is dominant, variance of acceleration in a front-back direction of the moving body is greater than variance of acceleration in a left-right direction of the moving body, and a density distribution of acceleration in a back direction of the moving body is greater than a density distribution of acceleration in a front direction of the moving body, the front-back direction including a movement direction of the moving body and an opposite direction of the movement direction, the left-right direction crossing the front-back direction.

Moreover, for example, the identifying may include: a first step of determining the gravitational acceleration direction obtained from the acceleration data as a downward direction of an up-down direction of the moving body, according to the movement characteristics; and a second step of determining a front-back direction of the moving body from the gravitational acceleration direction obtained from the acceleration data and variance of acceleration in a vertical direction, and determining a back direction of the front-back direction from a gravity center of the variance of acceleration in the vertical direction, according to the movement characteristics, the front-back direction including a movement direction of the moving body and an opposite direction of the movement direction.

Moreover, for example, the first step includes: extracting second acceleration data having a norm that is approximately 1 G from first acceleration data indicating the certain amount of acceleration obtained in the obtaining; and applying a rotation matrix to the first acceleration data so that a direction of an average vector of the extracted second acceleration data is the gravitational acceleration direction, the rotation matrix causing the direction of the average vector to be a negative direction of a Z-axis of the coordinate system.

Moreover, for example, the second step includes: calculating two eigenvalues and two eigenvectors from the first acceleration data to which the rotation matrix has been applied in the applying; a first determination step of determining, as the front-back direction, a direction of one of the two eigenvectors corresponding to a larger one of the two eigenvalues calculated in the calculating, the direction of the one of the two eigenvectors being a direction on the xy-plane that is a vertical direction relative to the Z-axis; and a second determination step of determining a direction of the front-back direction determined in the first determination step as the back direction of the front-back direction, the direction being a direction in which a gravity center of the first acceleration data, to which the rotation matrix has been applied, on the xy-plane is displaced from an origin of the xy-plane.

Moreover, for example, the orientation method may further include: registering a mounting angle of the device that indicates the orientation of the device identified in the identifying and is expressed in the coordinate system; and converting coordinates of at least one of acceleration data and angular velocity data obtained by the device, using the mounting angle registered in the registering.

Moreover, for example, the orientation method may further include: when the obtaining and the identifying are newly performed after the converting, determining whether the mounting angle registered in the registering is to be updated; and when the mounting angle registered in the registering is determined to be updated in the determining, updating the mounting angle registered in the registering to a mounting angle of the device that indicates an orientation of the device identified in the identifying newly performed and is expressed in the coordinate system.

Moreover, for example, in the determining, whether the mounting angle registered in the registering is to be updated may be determined according to whether a difference between the mounting angle of the device that indicates the orientation of the device identified in the identifying newly performed after the converting and is expressed in the coordinate system and the mounting angle registered in the registering is greater than or equal to a threshold value.

Moreover, for example, in the obtaining, the acceleration detected by the acceleration sensor while the moving body is moving over a predetermined distance may be obtained as the certain amount of acceleration.

Moreover, for example, in the obtaining, the acceleration detected by the acceleration sensor while the moving body is moving for a predetermined time may be obtained as the certain amount of acceleration.

Moreover, for example, the orientation identification method may further include: when the moving body is other than a wheeled vehicle, performing a calibration movement in which an acceleration, a forward movement, and a stop are performed at least once in a state in which the moving body is caused to take a horizontal attitude in which a downward direction of the moving body corresponds to the gravitational acceleration direction. In the obtaining, acceleration of the moving body may be obtained when the performing movement is performed. In the identifying, the orientation of the device may be identified from acceleration data indicating the acceleration of the moving body obtained in the obtaining when the performing is performed, according to characteristics indicated by statistics of the acceleration of the moving body obtained when the performing is performed, as the movement characteristics.

Moreover, a recording medium according to one aspect of the present disclosure is a non-transitory computer-readable recording medium for use in a computer, the recording medium having a computer program recorded thereon for causing the computer to execute an orientation identification method for identifying an orientation of a device installed by being mounted on a moving body, the orientation identification method including: obtaining a certain amount of acceleration in three mutually orthogonal directions detected by an acceleration sensor included in the device; and identifying the orientation of the device expressed in a coordinate system from acceleration data indicating the certain amount of acceleration obtained in the obtaining, according to movement characteristics indicated by statistics of acceleration during movement of the moving body expressed in the coordinate system, the coordinate system including a gravitational acceleration direction as an axis.

Embodiments described below each show a specific example of the present disclosure. The numerical values, shapes, structural components, steps, and the processing order of the steps, etc. shown in the following embodiments are mere examples, and are not intended to limit the scope of the present disclosure. Furthermore, among the structural components in the following embodiments, structural components not recited in any one of the independent claims which indicate the broadest concepts are described as optional structural components. Each of the embodiments can be combined with one or more of the other embodiments.

Embodiment

Hereinafter, an orientation identification method etc. for use in device 1 installed by being mounted on moving body 2 will be described with reference to the drawings.

[Device 1]

FIG. 1 is a diagram illustrating an example of device 1 in the present embodiment.

Device 1 is installed by being mounted on moving body 2. Device 1 includes at least an acceleration sensor, and detects acceleration in three mutually orthogonal directions. Here, the three mutually orthogonal directions make up a coordinate system with reference to device 1 (hereinafter referred to as a device coordinate system) as shown in FIG. 1, and are, for example, the RPY axes, that is, the roll axis (R), the pitch axis (P), and the yaw axis (Y). It should be noted that the device coordinate system is not limited to the RPY axes, and may include XYZ axes as long as the XYZ axes are with reference to device 1.

Moreover, as shown in FIG. 1, device 1 is a smartphone having, for example, an acceleration sensor built-in, but the present disclosure is not limited to this. Device 1 may be a mobile terminal, such as a tablet, and a vehicle-mounted device, such as a drive recorder or a vehicle-mounted camera, as long as the mobile terminal and the vehicle-mounted device have an acceleration sensor built-in and can output detected acceleration.

[Moving Body 2]

Figure 2A:
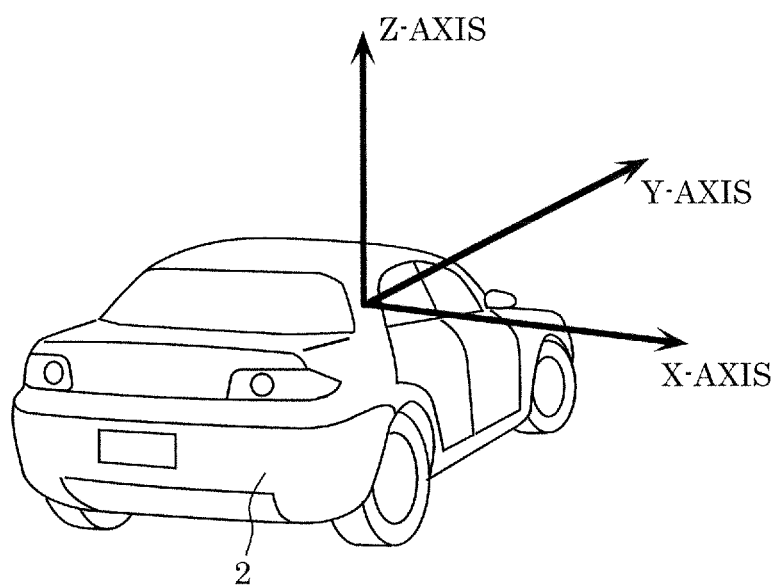
FIG. 2A is a diagram illustrating an example of a moving body in the embodiment.
Figure 2B:
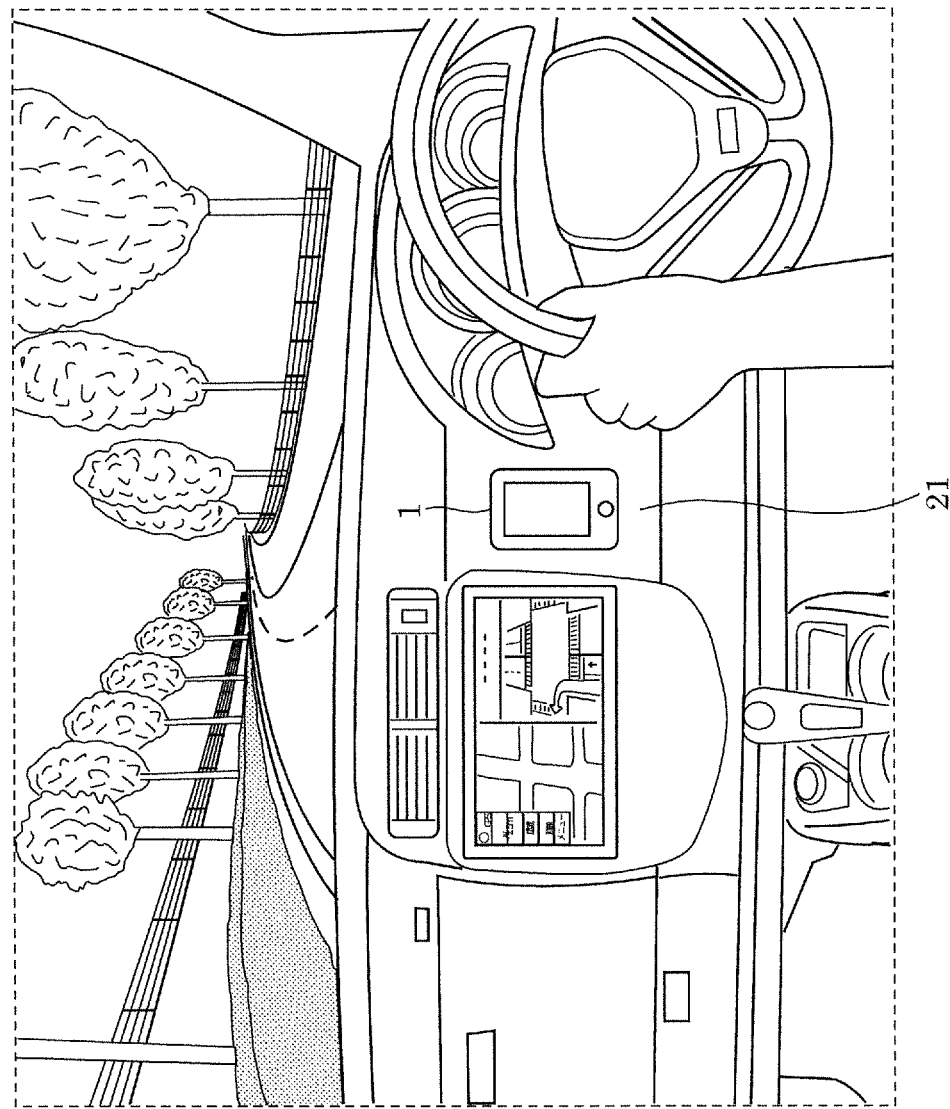
FIG. 2B is a diagram illustrating an example of a state in which the device is mounted on the moving body shown in FIG. 2A.

FIG. 2A is a diagram illustrating an example of moving body 2 in the present embodiment. FIG. 2B is a diagram illustrating an example of a state in which device 1 is mounted on moving body 2 shown in FIG. 2A. FIG. 2B shows part of the interior space of moving body 2. It should be noted that in FIG. 2A, the positive direction of the Y-axis is a movement direction that is a direction in which moving body 2, which is a car, moves forward, the positive direction of the Z-axis is the upward direction of moving body 2, and the positive direction of the X-axis is the right direction of moving body 2. This ZYX coordinate system is referred to as a moving body coordinate system in the following description.

Moving body 2 moves with device 1 mounted thereon. As shown in FIG. 2A, moving body 2 is, for example, a car, but the present disclosure is not limited to this. Moving body 2 may have movement characteristics in which a movement in the horizontal attitude in which a gravitational acceleration direction is the downward direction is dominant and variance characteristics of acceleration during movement are known. Moving body 2 may be a vehicle, such as a motorbike, an airplane, and a ship For example, when moving body 2 is a car as shown in FIG. 2A, device 1 may be installed by being mounted on part of dashboard 21 as shown in FIG. 2B. It should be noted that the installment of device 1 is not limited to the method shown in FIG. 2B.

Since it can be said that on average, vehicles, such as cars, travel over a long distance in a flat area, the movement of moving body 2, such as a car, in the horizontal attitude relative to the gravitational acceleration direction (the negative direction of the Z-axis in FIG. 2A) is dominant. Besides, it can be empirically said that on average, cars travel straight for a longer time period than turn to the right or left. For this reason, it can be said that on average, moving body 2, such as a car, has greater variance of acceleration in a front-back direction (the Y-axis direction in FIG. 2A) than variance of acceleration in a left-right direction (the X-axis direction in FIG. 2A). Furthermore, since it can be empirically said that on average, cars are smooth when accelerating but often make an impact when decelerating, moving body 2, such as a car, has a higher average value of acceleration at a time of deceleration than an average value of acceleration at a time of acceleration.

To put it differently, when moving body 2 is a vehicle, movement characteristics of moving body 2 indicate that a movement in a state in which a downward direction of an up-down direction of moving body 2 is a gravitational acceleration direction is dominant. In addition, the movement characteristics indicate that the variance of acceleration in the front-back direction that includes the movement direction of moving body 2 and an opposite direction of the movement direction is greater than the variance of acceleration in the left-right direction that crosses the front-back direction of moving body 2, and indicate that a density distribution of acceleration in a back direction of moving body 2 is greater than a density distribution of acceleration in a front direction of moving body 2. Accordingly, the movement characteristics can be expressed with statistics of acceleration during movement of moving body 2 expressed in the moving body coordinate system including the gravitational acceleration direction as an axis.

[Configuration of Orientation Identification System 10]

Figure 3:
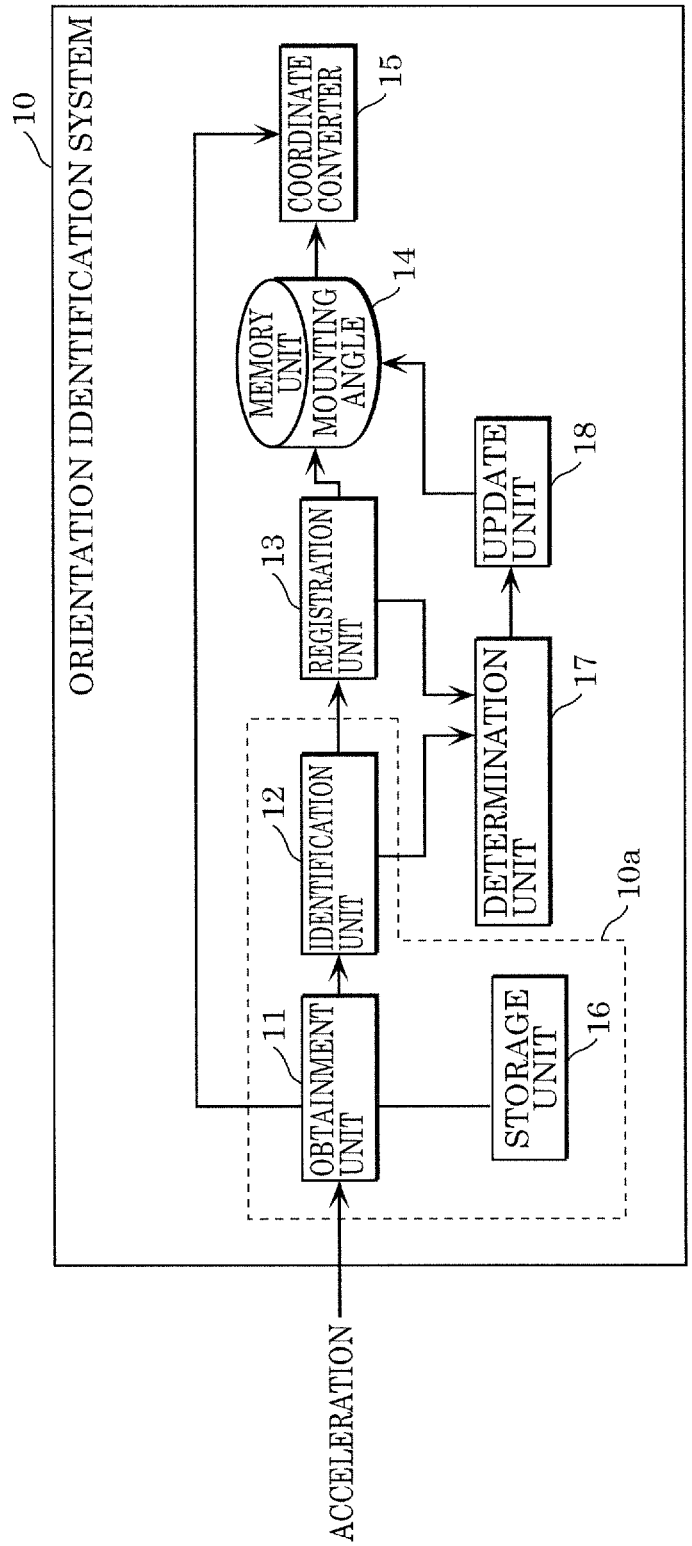
FIG. 3 is a block diagram illustrating an example of a configuration of an orientation identification system in the embodiment.

FIG. 3 is a block diagram illustrating an example of a configuration of orientation identification system 10 in the present embodiment.

Orientation identification system 10 is realized by a computer including, for example, a processor (micro processing unit), a memory, and a communication interface. In the present embodiment, orientation identification system 10 is included in device 1, but the present disclosure is not limited to this. Device 1 may include only minimum structural component 10a of orientation identification system 10, and the other structural components of orientation identification system 10 may be included in a server or the cloud, and operate.

As shown in FIG. 3, orientation identification system 10 includes obtainment unit 11, identification unit 12, registration unit 13, memory unit 14, coordinate converter 15, storage unit 16, determination unit 17, and update unit 18. It should be noted that minimum structural component 10a includes obtainment unit 11, identification unit 12, and storage unit 16 in FIG. 3, but storage unit 16 is not an essential structural component.

<Obtainment Unit 11>

Obtainment unit 11 obtains a certain amount of acceleration in three mutually orthogonal directions detected by the acceleration sensor of device 1. Here, for example, obtainment unit 11 may obtain, as a certain amount of acceleration, acceleration detected by the acceleration sensor of device 1 while moving body 2 is moving over a predetermined distance. In addition, for example, obtainment unit 11 may obtain, as a certain amount of acceleration, acceleration detected by the acceleration sensor of device 1 while moving body 2 is moving for a predetermined time.

In the present embodiment, orientation identification system 10 is included in device 1, and thus obtainment unit 11 obtains a certain amount of acceleration expressed in the device coordinate system detected by the acceleration sensor included in device 1 while moving body 2 is moving for a predetermined time or over a predetermined distance. Here, the predetermined time is, for example, approximately five minutes, but the present disclosure is not limited to this. The predetermined distance denotes a total movement distance calculated using a global positioning system (GPS), and is, for example, approximately several kilometers, but the present disclosure is not limited to this. The predetermined time and distance may be a time and a distance at which the movement characteristics of moving body 2 emerge, respectively.

It should be noted that when obtainment unit 11 sequentially obtains acceleration detected by acceleration sensor of device 1, obtainment unit 11 may accumulate the obtained acceleration in storage unit 16, and send the acceleration to identification unit 12 when obtainment unit 11 has accumulated a predetermined amount of the acceleration. When obtainment unit 11 obtains the certain amount of acceleration detected by the acceleration sensor included in device 1, obtainment unit 11 may send the obtained certain amount of acceleration to identification unit 12 without storage unit 16.

Moreover, in response to a request from coordinate converter 15, obtainment unit 11 may send acceleration stored in storage unit 16 or sequentially obtained acceleration to coordinate converter 15.

Furthermore, when device 1 includes an angular velocity sensor, obtainment unit 11 may further sequentially obtain angular velocity detected by device 1, and store the obtained angular velocity into storage unit 16. Subsequently, in response to a request from coordinate converter 15, obtainment unit 11 may send the stored angular velocity to coordinate converter 15.

<Storage Unit 16>

Storage unit 16 includes, for example, a hard disk drive (HDD) or a memory, and acceleration obtained by obtainment unit 11 is stored into storage unit 16. It should be noted that when device 1 includes an angular velocity sensor, and obtainment unit 11 obtains angular velocity from device 1, the angular velocity obtained by obtainment unit 11 may be stored into storage unit 16.

<Identification Unit 12>

Identification unit 12 identifies an orientation of device 1 expressed in the moving body coordinate system from acceleration data indicating the certain amount of acceleration obtained by obtainment unit 11, according to movement characteristics indicated by statistics of acceleration during movement of moving body 2 expressed in the moving body coordinate system.

More specifically, first, identification unit 12 determines a gravitational acceleration direction obtained from acceleration data as the downward direction of the up-down direction of moving body 2, according to the movement characteristics of moving body 2. This is because when moving body 2 takes the horizontal attitude and has no change in velocity, that is, no acceleration during movement, the acceleration sensor included in device 1 installed in moving body 2 merely detects gravitational acceleration. For this reason, when moving body 2 takes the horizontal attitude and has no acceleration during movement, a resultant vector of acceleration expressed in the device coordinate system obtained by obtainment unit 11 corresponds to a gravitational acceleration vector. Accordingly, identification unit 12 can identify the gravitational acceleration direction from a density distribution of the resultant vector of the acceleration expressed in the device coordinate system obtained by obtainment unit 11.

Here, an example of a process (implementation) for actually identifying a gravitational acceleration direction will be described. Identification unit 12 may extract acceleration data (second acceleration data) having a norm that is approximately 1 G from acceleration data (first acceleration data) indicating the certain amount of acceleration obtained by obtainment unit 11, and determine a direction of an average vector of the extracted acceleration data as a gravitational acceleration direction. This is because acceleration data indicating only gravitational acceleration when moving body 2 takes the horizontal attitude and has no change in velocity can be extracted by extracting acceleration data in which the length of a norm, that is, an acceleration vector is approximately 1 G. Subsequently, identification unit 12 may apply, to the first acceleration data, a rotation matrix that causes the direction of the average vector to be the negative direction of the Z-axis of the moving body coordinate system so that the direction of the average vector is the gravitational acceleration direction.

It should be noted that although, strictly speaking, gravitational acceleration slightly differs from place to place, and thus it is necessary to calculate gravitational acceleration according to a location from GPS data, in the present embodiment, gravitational acceleration is assumed to be approximately 1 G, that is, approximately 9.8 m/s$^2$.

Figure 4:
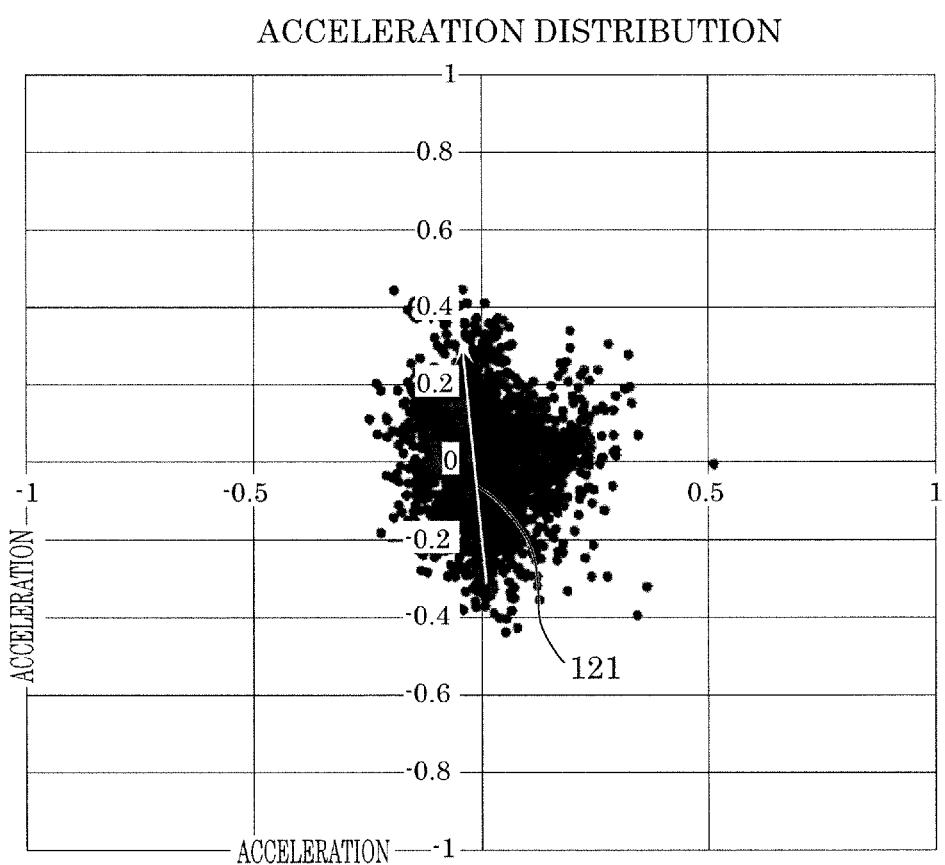
FIG. 4 is a graph illustrating an example of an acceleration distribution of the moving body on an xy-plane expressed in a moving body coordinate system in the embodiment.
Figure 5:
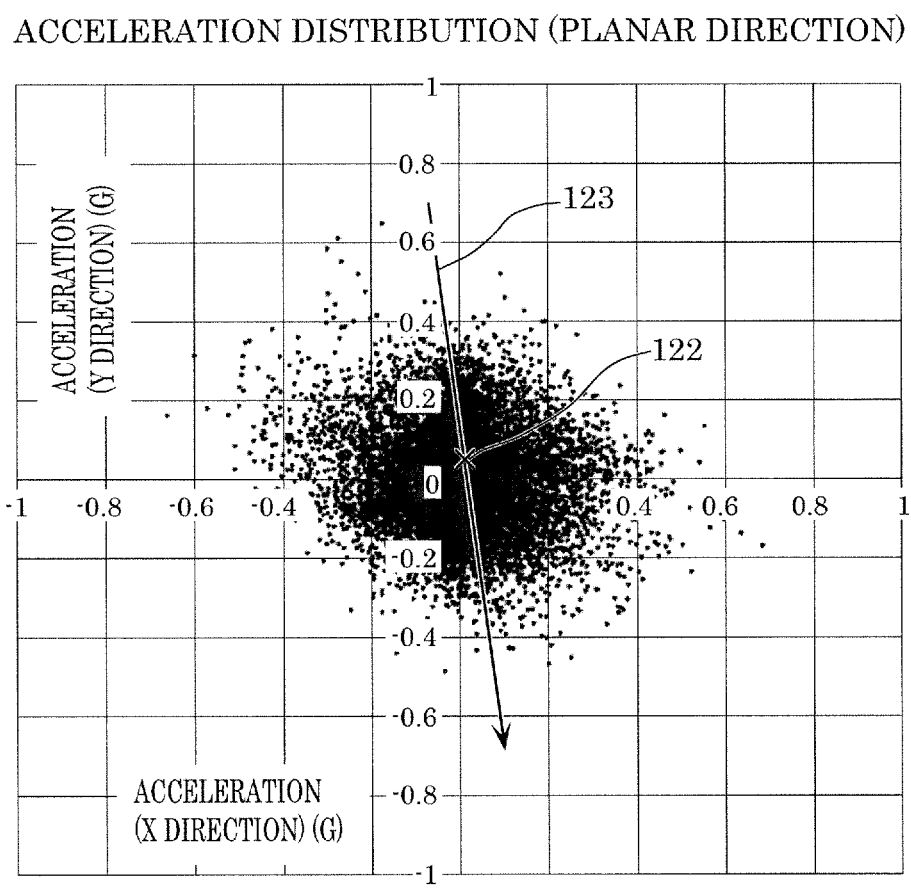
FIG. 5 is a graph illustrating another example of an acceleration distribution of the moving body on the xy-plane expressed in the moving body coordinate system in the embodiment.

FIG. 4 is a graph illustrating an example of an acceleration distribution of moving body 2 on an xy-plane expressed in a moving body coordinate system in the present embodiment. FIG. 5 is a graph illustrating another example of an acceleration distribution of moving body 2 on the xy-plane expressed in the moving body coordinate system in the present embodiment.

Next, according to the movement characteristics, identification unit 12 determines the front-back direction of moving body 2 from a gravitational acceleration direction and vertical (i.e., horizontal) acceleration variance obtained from acceleration data, and determines the back direction of the front-back direction of moving body 2 from the gravity center of the horizontal acceleration variance. This is because it can be empirically said that when moving body 2 is a car, for example, on average, moving body 2 travels straight for a longer period of time than turns to the right or left, and it is possible to identify the front-back direction of moving body 2 from the acceleration on the xy-plane expressed in the moving body coordinate system, that is, a horizontal acceleration distribution. Accordingly, identification unit 12 can identify, as the front-back direction, a direction having greater acceleration variance in the horizontal acceleration distribution. This process will be described with reference to FIG. 4. It is clear from the horizontal acceleration distribution shown in FIG. 4 that dispersion, that is, variance is greater in the longitudinal direction than in the lateral direction. In consequence, identification unit 12 can identify, as the front-back direction, the direction of arrow 121. It should be noted that the upward direction of arrow 121 at this moment is merely assumed for convenience. Moreover, it can be empirically said that when moving body 2 is a car, for example, on average, moving body 2 more often makes an impact when decelerating than when accelerating, and thus it is possible to identify the back direction of moving body 2 from a front-back acceleration distribution. In other words, identification unit 12 can identify, as the back direction, a direction having a broader density distribution of acceleration variance in the front-back acceleration distribution.

Here, an example of a process (implementation) for actually performing the above-described steps will be described. First, identification unit 12 may calculate two eigenvalues and two eigenvectors from the first acceleration data to which the above rotation matrix is applied, and determine, as the front-back direction, the direction of one of the two calculated eigenvectors that corresponds to a larger one of the two calculated eigenvalues. This is because the directions of the two calculated eigenvectors correspond to directions of variance of the first acceleration data in the horizontal direction. In the present embodiment, the directions of the two eigenvectors correspond to the left-right direction or front-back direction of moving body 2, and one of the two eigenvectors having a larger one of the two eigenvalues corresponds to the front-back direction of moving body 2. This will be described with reference to FIG. 5. Identification unit 12 first identifies, as the front-back direction, the direction of eigenvector 122 corresponding to a larger one of the two eigenvalues in the horizontal acceleration distribution shown in FIG. 5. Next, identification unit 12 may determine, as the back direction, a direction in which the gravity center on a horizontal plane (xy-plane expressed in the moving body coordinate system) of the first acceleration data to which the above rotation matrix is applied is displaced from the origin of the horizontal plane in the front-back direction. The gravity center is an average value of the acceleration distribution of the first acceleration data to which the rotation matrix is applied. Referring to FIG. 5, identification unit 12 may calculate gravity center 123 in the horizontal acceleration distribution shown in FIG. 5, and identify, as the back direction, a direction of a location in which calculated gravity center 123 is displaced from the origin on eigenvector 122. It should be noted that identification unit 12 also calculates a rotation matrix (hereinafter referred to as an adjusted rotation matrix) obtained by adjusting the rotation matrix applied to the first acceleration data so that the direction of the eigenvector corresponding to the larger one of the two eigenvalues is the direction of the Y-axis and the gravity center of the rotation matrix is on the negative direction of the Y-axis. As a result, identification unit 12 can identify the mounting angle of device 1 from the adjusted rotation matrix.

In this manner, identification unit 12 can identify the orientation of device 1 expressed in the moving body coordinate system from the certain amount of the acceleration data obtained by obtainment unit 11, using the known movement characteristics during movement of moving body 2.

<Registration Unit 13>

Registration unit 13 registers the mounting angle of device 1 that indicates the orientation of device 1 identified by identification unit 12 and is expressed in the moving body coordinate system. In the present embodiment, registration unit 13 registers the mounting angle of device 1 identified by identification unit 12 with memory unit 14. It should be noted that registration unit 13 may register, as the mounting angle identified by identification unit 12, the adjusted rotation matrix calculated by identification unit 12.

<Memory Unit 14>

Memory unit 14 includes, for example, a hard disk drive (HDD) or a memory, and the mounting angle of device 1 identified by identification unit 12 is registered with memory unit 14 by registration unit 13. It should be noted that the adjusted rotation matrix calculated by identification unit 12 may be registered as the mounting angle of device 1 identified by identification unit 12 with memory unit 14.

<Coordinate Converter 15>

Coordinate converter 15 converts coordinates of at least one of acceleration data and angular velocity data obtained by device 1, using the mounting angle registered by registration unit 13. In the present embodiment, coordinate converter 15 converts a device coordinate system of target data obtained by obtainment unit 11 into the moving body coordinate system, using the mounting angle registered with memory unit 14. Here, the target data is data having an output value that varies in accordance with the mounting orientation of device 1, and is, for example, at least one of acceleration data and angular velocity data.

Moreover, coordinate converter 15 obtains target data by requesting the target data from obtainment unit 11. Subsequently, coordinate converter 15 outputs target data converted into the moving body coordinate system.

It should be noted that when update unit 18 updates the mounting angle registered with memory unit 14, coordinate converter 15 may convert target data obtained after the update into the moving body coordinate system.

<Determination Unit 17>

When identification unit 12 identifies a new mounting angle of device 1, determination unit 17 determines whether the mounting angle registered by registration unit 13 is to be updated. More specifically, determination unit 17 determines whether the mounting angle registered by registration unit 13 is to be updated, according to whether a difference between the registered mounting angle and the new mounting angle of device 1 that indicates an identified new orientation of device 1 and is expressed in the moving body coordinate system is greater than a threshold value. Here, the threshold value may be, for example, a tolerance for a difference in mounting angle. Moreover, the threshold value may be an elapsed time since a difference in mounting angle was first determined, and may be a movement distance of moving body 2 since a difference in mounting angle was first determined.

In the present embodiment, when identification unit 12 identifies a new mounting angle of device 1, determination unit 17 determines whether the mounting angle registered with memory unit 14 is to be updated. This is because although device 1 is secured by being mounted on moving body 2, device 1 may be removed and then mounted again according to the needs of the user of moving body 2, and the mounting angle of device 1 may change due to, for example, vibration during movement of moving body 2. The change in mounting orientation prevents effective use of target data. For this reason, determination unit 17 is caused to determine whether the mounting angle is to be updated.

It should be noted that determination unit 17 may determine whether the mounting angle of device 1 identified by identification unit 12 is new, and need not perform the above update determination when the mounting angle is new. In contrast, when the mounting angle is not new, determination unit 17 may perform the above update determination because identification unit 12 has identified a new mounting angle of device 1.

<Update Unit 18>

When determination unit 17 determines that the mounting angle is to be updated, update unit 18 updates the mounting angle registered by registration unit 13 to the mounting angle of device 1 that indicates the new orientation of device 1 identified by identification unit 12 and is expressed in the moving body coordinate system. In the present embodiment, when determination unit 17 determines that the mounting angle is to be updated, update unit 18 updates the mounting angle registered with memory unit 14 to the mounting angle of device 1 that indicates the new orientation of device 1 identified by identification unit 12.

In this manner, update unit 18 can continue to effectively use target data by updating the mounting angle to the new mounting angle identified by identification unit 12, according to whether determination unit 17 determines that the mounting angle is to be updated.

[Operation of Orientation Identification System 10]

Hereinafter, an example of operation of orientation identification system 10 configured as above will be described.

Figure 6:
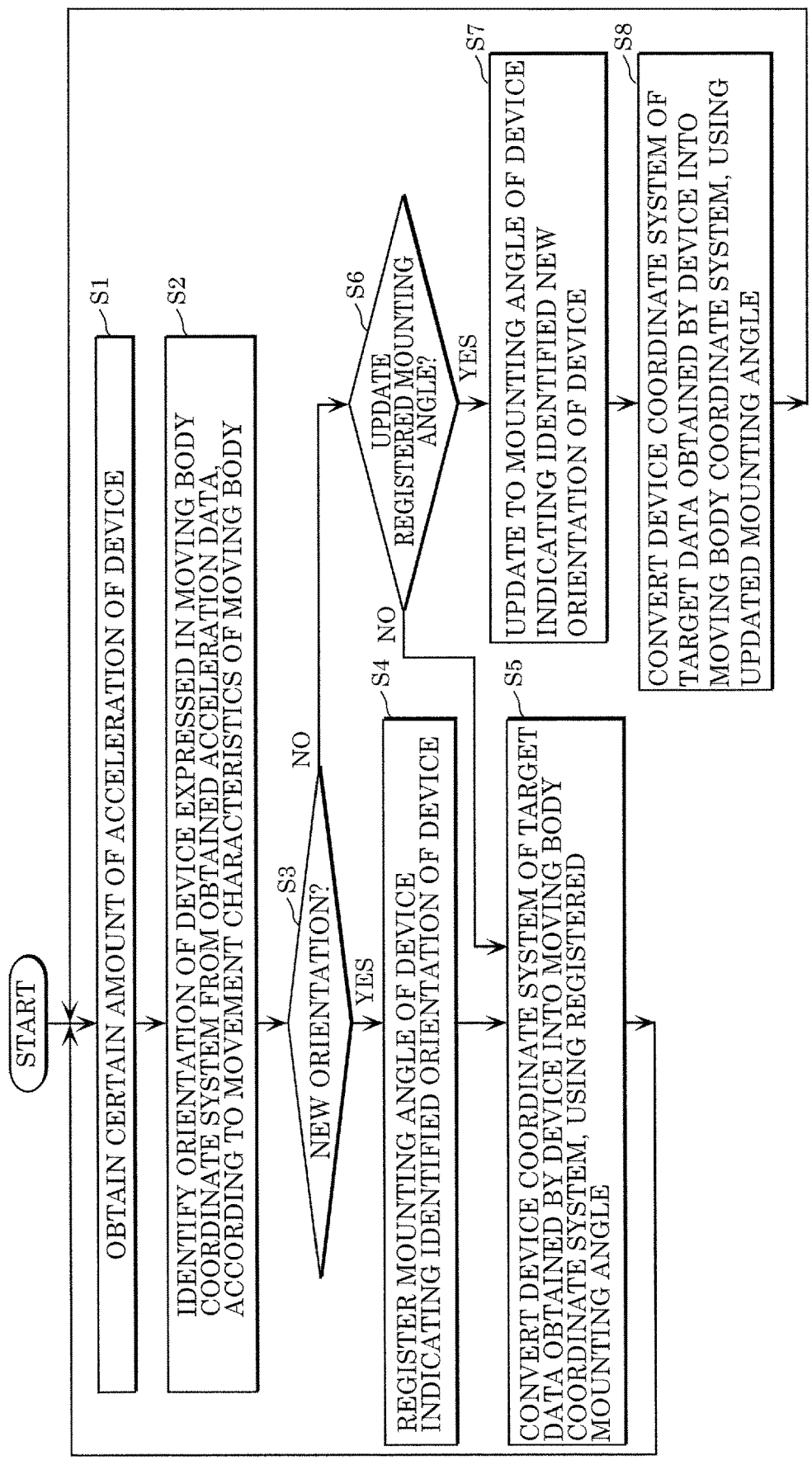
FIG. 6 is a flow chart illustrating overall operation of the orientation identification system in the embodiment.
Figure 7:
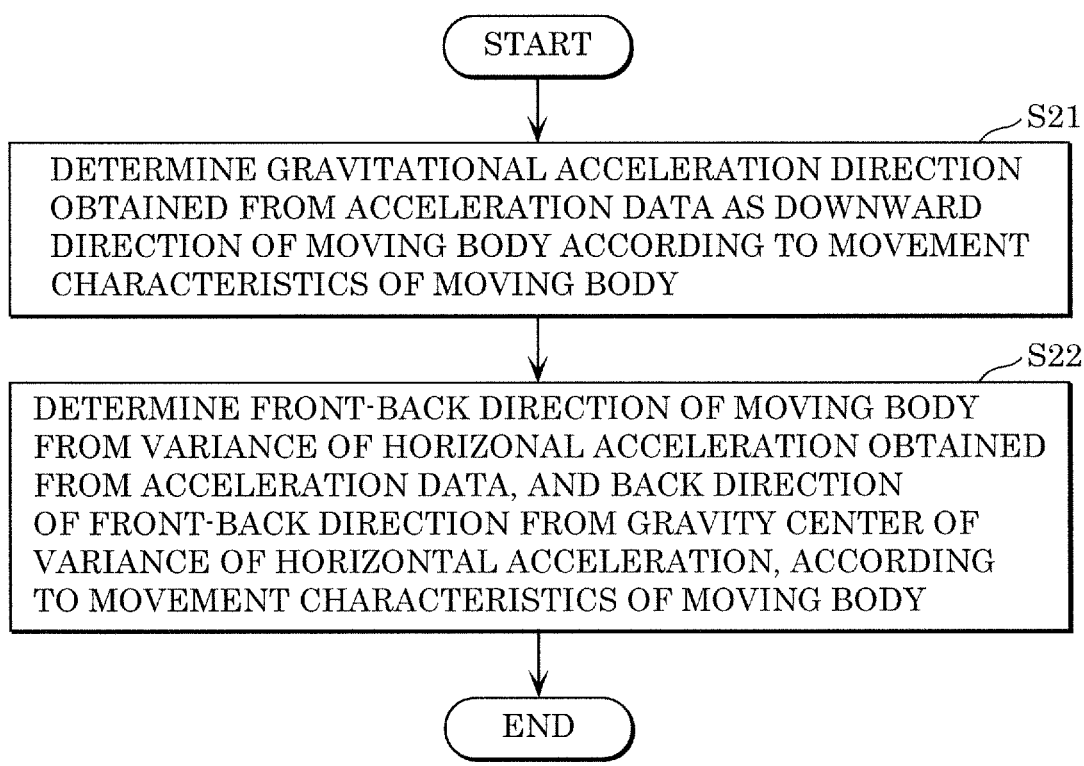
FIG. 7 is a flow chart illustrating detailed operation in step S2 shown in FIG. 6.
Figure 8:
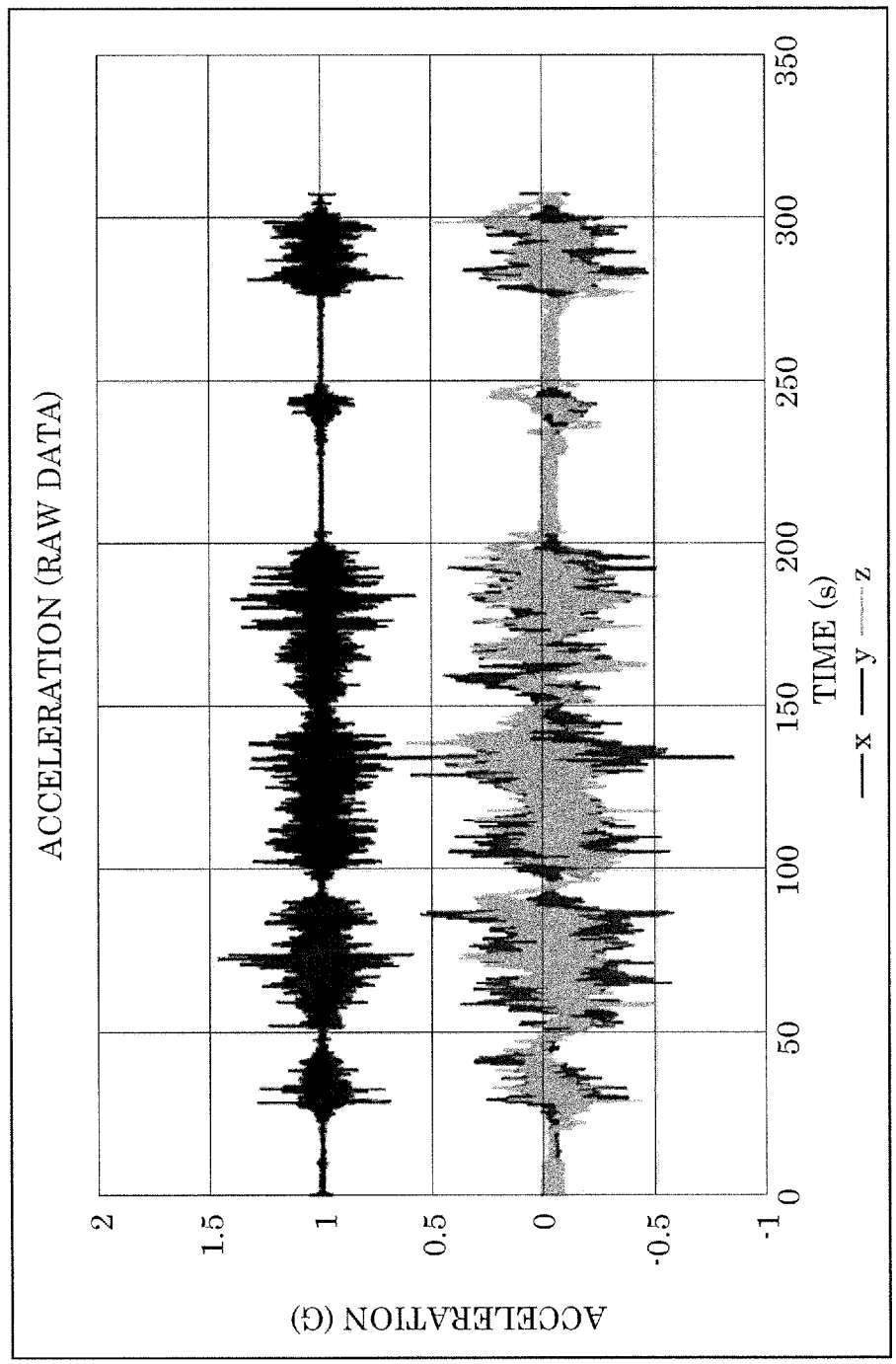
FIG. 8 shows an example of acceleration data obtained by the orientation identification system in the embodiment.

FIG. 6 is a flow chart illustrating overall operation of orientation identification system 10 in the present embodiment. FIG. 7 is a flow chart illustrating detailed operation in step S2 shown in FIG. 6. FIG. 8 shows an example of acceleration data obtained by orientation identification system 10 in the present embodiment. The acceleration data shown in FIG. 8 is acceleration data (raw data) as detected by the acceleration sensor included in device 1.

First, orientation identification system 10 obtains a certain amount of acceleration of device 1 (S1). More specifically, orientation identification system 10 obtains a certain amount of acceleration in three mutually orthogonal directions detected by the acceleration sensor included in device 1. In the following description, it is assumed that orientation identification system 10 obtains acceleration data that is raw data detected by device 1 for approximately 5 minutes, that is, approximately 300 seconds, as shown by, for example, FIG. 8.

Next, orientation identification system 10 identifies an orientation of device 1 expressed in the moving body coordinate system from the acceleration data obtained in step S1, according to the movement characteristics of moving body 2 (S2).

More specifically, as shown in FIG. 7, first, orientation identification system 10 executes the first step of determining a gravitational acceleration direction obtained from the acceleration data obtained in step S1 as the downward direction of moving body 2 according to movement characteristics of moving body 2 (S21). Subsequently, orientation identification system 10 executes the second step of determining a front-back direction of moving body 2 from horizontal acceleration variance obtained from the acceleration data, and determining a back direction of the front-back direction of moving body 2 from the gravity center of the horizontal acceleration variance (S22).

Here, the following describes an example of an actual process when orientation identification system 10 executes the first step and the second step with reference to FIG. 9 to FIG. 12B.

Figure 9:
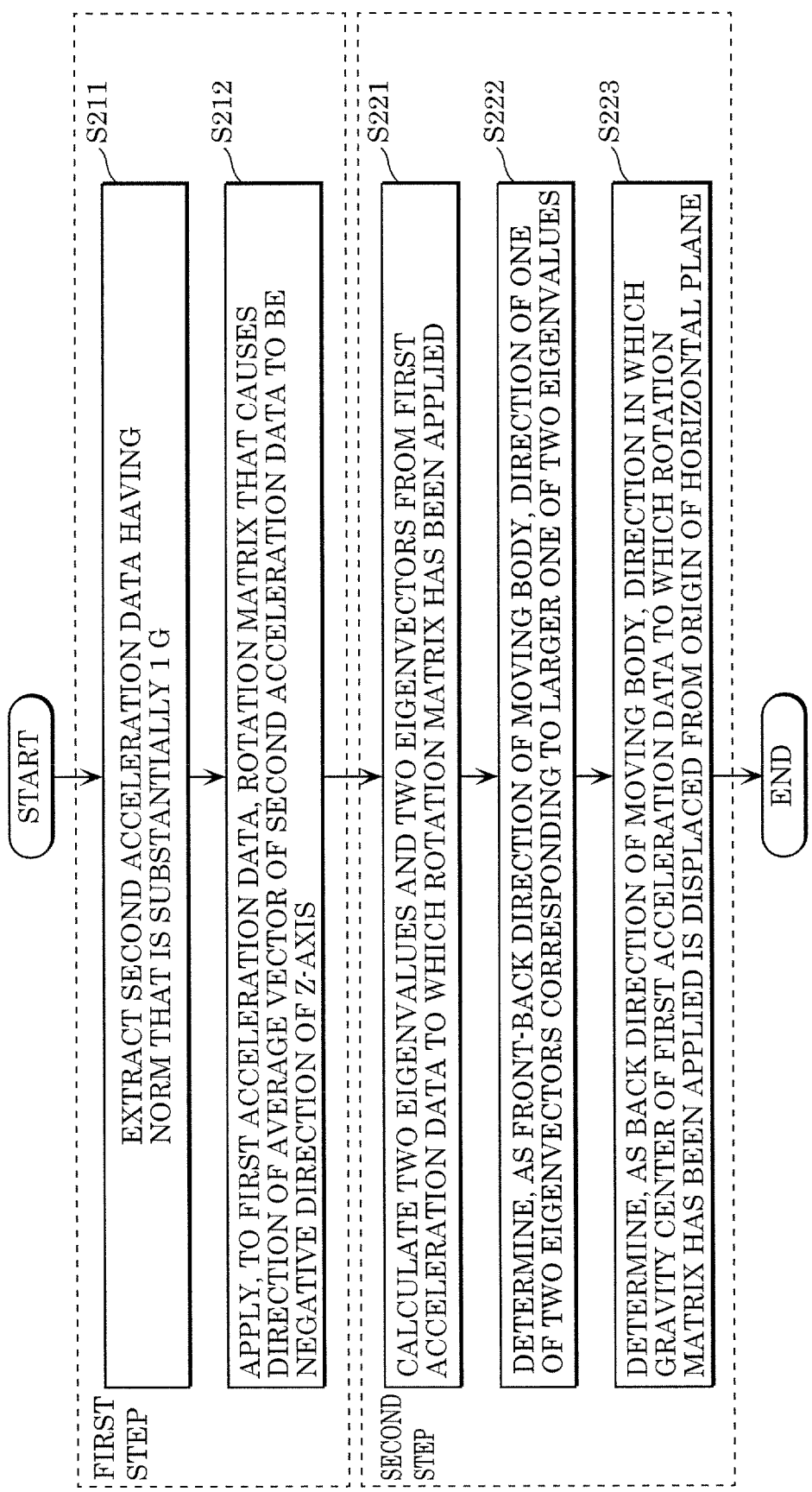
FIG. 9 is a flow chart illustrating an example of a processing method when the detailed operation shown in FIG. 7 is actually performed.
Figure 10:
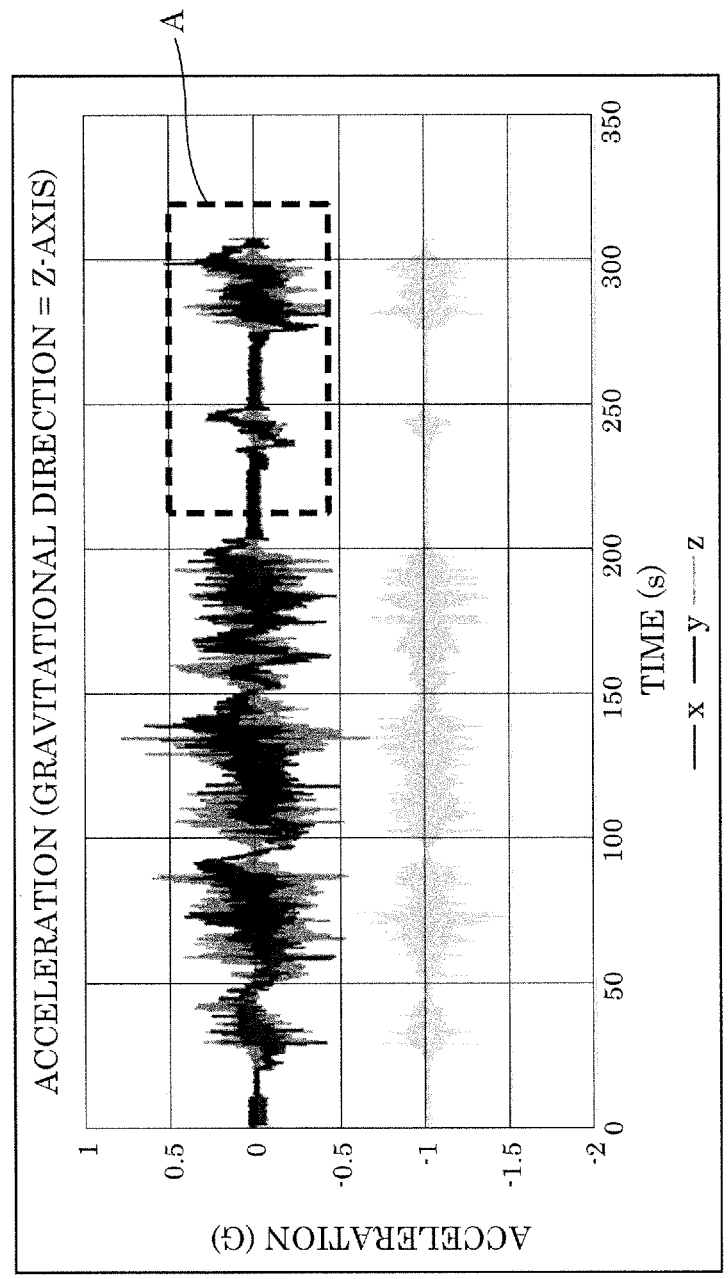
FIG. 10 is a graph illustrating acceleration data after the process in step S21 shown in FIG. 7 is performed.
Figure 11:
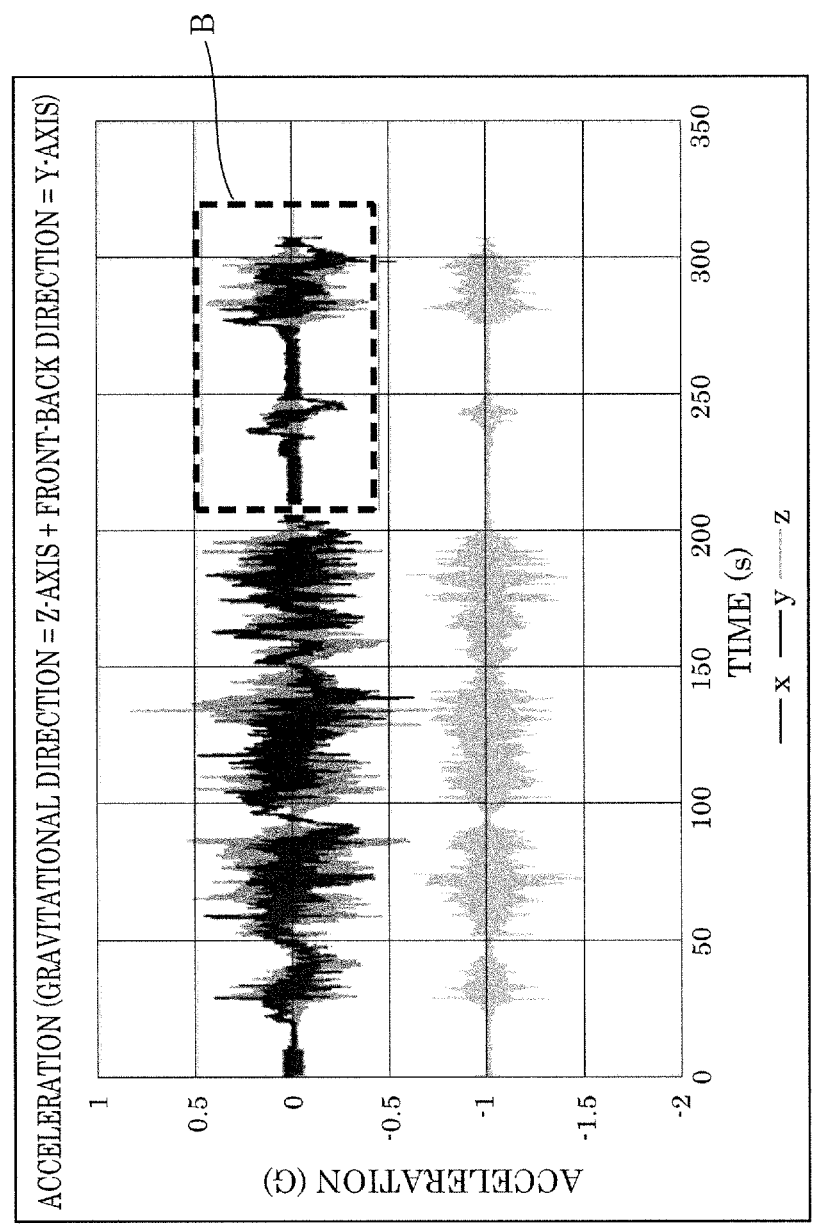
FIG. 11 is a graph illustrating acceleration data after the process in step S22 shown in FIG. 7 is performed.
Figure 12A:
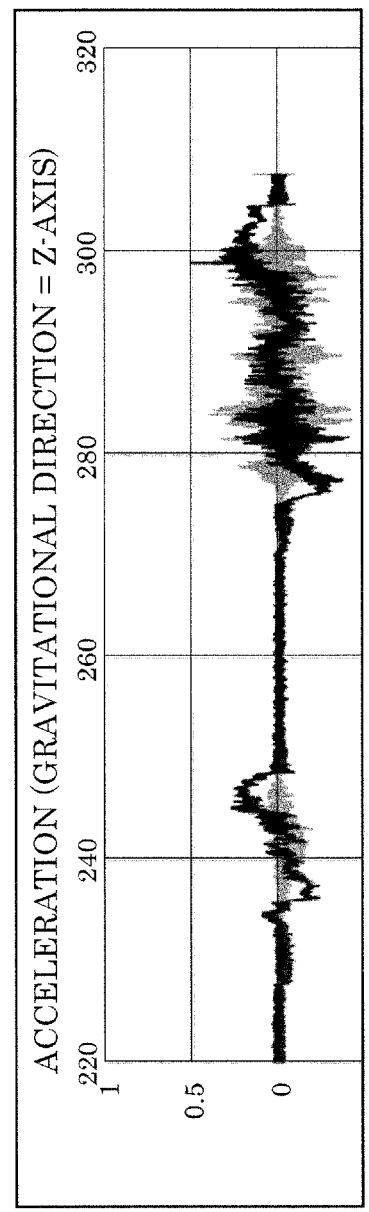
FIG. 12A is an enlarged view of region A in FIG. 10 indicating acceleration data.
Figure 12B:
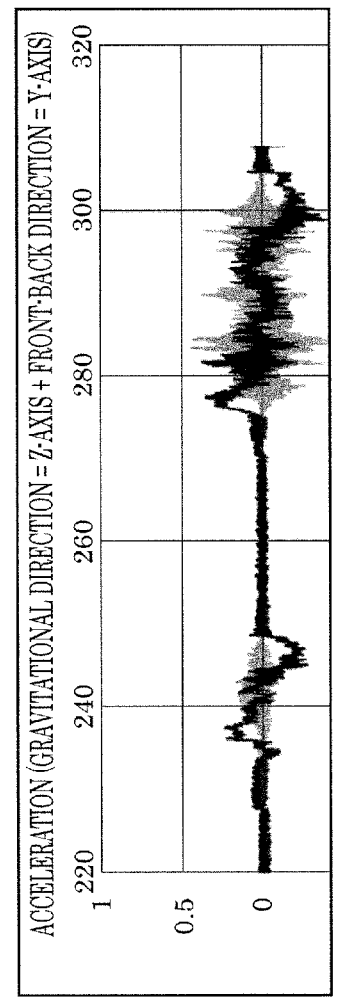
FIG. 12B is an enlarged view of region B in FIG. 11 indicating acceleration data.

FIG. 9 is a flow chart illustrating an example of a processing method when the detailed operation shown in FIG. 7 is actually performed. FIG. 10 is a graph illustrating acceleration data after the process in step S21 shown in FIG. 7 is performed. FIG. 11 is a graph illustrating acceleration data after the process in step S22 shown in FIG. 7 is performed. FIG. 12A is an enlarged view of region A in FIG. 10 indicating acceleration data. FIG. 12B is an enlarged view of region B in FIG. 11 indicating acceleration data.

In step S21, that is, the first step, first, orientation identification system 10 extracts second acceleration data having a norm that is approximately 1 G from first acceleration data indicating the certain amount of acceleration obtained in step S1 (S211). Subsequently, orientation identification system 10 applies, to the first acceleration data, a rotation matrix that causes a direction of an average vector of the extracted second acceleration data to be the negative direction of the Z-axis in the moving body coordinate system (S212). These steps will be described with reference to FIG. 8 and FIG. 10. In the first step, first, orientation identification system 10 extracts acceleration data having a norm that is almost 1 G from acceleration data that shows acceleration close to 1 G in FIG. 8 (acceleration along the Y-axis in FIG. 8). Subsequently, because the extracted acceleration data having the norm that is almost 1 G can be identified as gravitational acceleration, orientation identification system 10 calculates a rotation matrix that causes the acceleration data having the norm that is almost 1 G to be in the negative direction of the Z-axis. Finally, orientation identification system 10 applies the calculated rotation matrix to the acceleration data shown in FIG. 8. As described above, it is possible to obtain acceleration data shown in FIG. 10 by converting the acceleration data close to 1 G along the Y-axis shown in FIG. 8 into acceleration data close to 1 G along the Z-axis, using the calculated rotation matrix.

Next, in step S22, that is, the second step, first, orientation identification system 10 calculates two eigenvalues and two eigenvectors from the first acceleration data to which the rotation matrix is applied in the first step (S221). Subsequently, orientation identification system 10 determines, as the front-back direction, a direction of one of the two eigenvectors corresponding to a larger one of the two calculated eigenvalues (S222). Finally, orientation identification system 10 determines, as the back direction, a direction in which the gravity center on the horizontal plane of the first acceleration data to which the rotation matrix is applied in the first step, that is, the xy-plane expressed in the moving body coordinate system is displaced from the origin of the horizontal plane in the front-back direction (S223). Referring to FIG. 10 and FIG. 11, in the second step, orientation identification system 10 calculates a rotation matrix that maximizes variance of acceleration data close to 0 G along the Y-axis shown in FIG. 10. This rotation matrix can be calculated from the eigenvector corresponding to the larger one of the two eigenvalues calculated in step S221 to step S223. Then, orientation identification system 10 applies the calculated rotation matrix to the acceleration data shown in FIG. 10. As described above, it is possible to obtain acceleration data shown in FIG. 11 by converting the acceleration data shown in FIG. 10, using the calculated rotation matrix.

Here, as shown in FIG. 12A, the first acceleration data to which the rotation matrix calculated in the first step is applied indicates that the acceleration along the Y-axis goes negative from close to 0 and then goes positive. This can be interpreted that moving body 2 decelerates from a stopped state and subsequently accelerates during movement of moving body 2, and thus such a movement is unnatural as a movement manner of moving body 2. In contrast, the first acceleration data to which the rotation matrix calculated in the second step is further applied indicates that the acceleration along the Y-axis goes positive from close to 0 and then goes negative. This can be interpreted that moving body 2 accelerates from a stopped state and subsequently decelerates during movement of moving body 2, and thus such a movement is natural as a movement manner of moving body 2.

By executing the first step and the second step described above, orientation identification system 10 can calculate the mounting angle of device 1 that indicates the orientation of device 1 and is expressed in the moving body coordinate system, from the rotation matrices used in the first step and the second step. It should be noted that according to the acceleration data shown in FIG. 11, the angle obtained by converting the acceleration data shown in FIG. 8, that is, the mounting angle includes 88.5 degrees along the X-axis, 2.1 degrees along the Y-axis, and 172.6 degrees along the Z-axis.

Referring back to FIG. 6, the following describes operation after the process for identifying the orientation of device 1.

After the orientation of device 1 is identified in step S2, orientation identification system 10 determines whether the orientation of device 1 identified by identification unit 12 is new (S3).

When the orientation is determined to be new in step S3 (YES in S3), orientation identification system 10 registers the mounting angle of device 1 indicating the identified orientation of device 1 (S4). In the present embodiment, orientation identification system 10 registers, with memory unit 14, the mounting angle of device 1 that indicates the orientation of device 1 identified in step S2 and is expressed in the moving body coordinate system.

Next, orientation identification system 10 converts a device coordinate system of target data obtained by device 1 into the moving body coordinate system, using the mounting angle registered in step S4 (S5). In the present embodiment, orientation identification system 10 converts a device coordinate system of target data into the moving body coordinate system, using the mounting angle registered in step S4. Here, as stated above, the target data is data having an output value that varies in accordance with the mounting orientation of device 1, and is, for example, at least one of acceleration data and angular velocity data.

In contrast, when the orientation is determined not to be new in step S3 (NO in S3), orientation identification system 10 determines whether a registered mounting angle is to be updated (S6). More specifically, orientation identification system 10 determines whether the mounting angle registered by registration unit 13 is to be updated, according to whether a difference between the registered mounting angle and the mounting angle of device 1 that indicates an identified new orientation of device 1 and is expressed in the moving body coordinate system is greater than a threshold value.

When the registered mounting angle is determined to be updated in step S6 (YES in S6), orientation identification system 10 updates the registered mounting angle to the mounting angle of device 1 that indicates the identified new orientation (S7). In the present embodiment, orientation identification system 10 updates the mounting angle registered with memory unit 14 to the mounting angle of device 1 that indicates the new orientation of device identified by identification unit 12.

Next, orientation identification system 10 converts the device coordinate system of the target data obtained by device 1 into the moving body coordinate system, using the mounting angle updated in step S7 (S8).

Orientation identification system 10 that performs such processes may repeat above-described step S1 to step S5 or step S1 to step S8.

It should be noted that when step S1 is performed for the first time, step S1 may be started when the user of moving body 2 presses a button etc. indicating, for example, the start of movement of moving body 2 or the acceleration sensor included in device 1 detects acceleration.

Advantageous Effects Etc

As described above, orientation identification system 10 can identify an orientation of device 1 expressed in a moving body coordinate system from a certain amount of acceleration data detected by an acceleration sensor included in device 1, according to known movement characteristics during movement of moving body 2. With this, it is possible to identify the orientation of device 1 using only the acceleration data detected by the acceleration sensor included in device 1 installed in moving body 2.

In other words, when identifying an orientation of device 1, orientation identification system 10 need not use a change in inclination angle of device 1, road grade information obtained from map information etc, or an azimuth obtained by a magnetic sensor etc., apart from the certain amount of acceleration data detected by the acceleration sensor included in device 1. Orientation identification system 10 can identify the orientation of device 1 when device 1 detects acceleration data and orientation identification system obtains only the detected acceleration data. As a result, orientation identification system 10 can effectively use target data having an output value that varies in accordance with a mounting orientation obtained by device 1 installed in moving body 2.

Further, orientation identification system 10 can identify an orientation of device 1 when using acceleration data obtained for a short period of time, such as approximately five minutes. To put it differently, orientation identification system 10 can identify an orientation of device 1 in a relatively short amount of time. Accordingly, the use of target data having an output value that varies in accordance with a mounting orientation obtained by device 1 can be started in a relatively short amount of time.

Moreover, when an orientation of device 1 changes after orientation identification system 10 identified the orientation of device 1, orientation identification system 10 can identify the changed orientation. Consequently, orientation identification system 10 can continue to effectively use target data having an output value that varies in accordance with a mounting orientation of device 1 even when an orientation of device 1 mounted on moving body 2 changes.

Variation 1

There are cases where movement characteristics in which variance of front-back acceleration is greater than variance of left-right acceleration are not satisfied depending on conditions during movement of moving body 2. When moving body 2 is a car, for example, acceleration data obtained under conditions, such as during traveling on a highway or constant-velocity traveling on a winding road, may not satisfy the movement characteristics in which the variance of front-back acceleration is greater than the variance of left-right acceleration.

The following describes a processing method when obtained data do not satisfy the movement characteristics of moving body 2 in which the variance of front-back acceleration is greater than the variance of left-right acceleration according to Variation 1.

Figure 13:
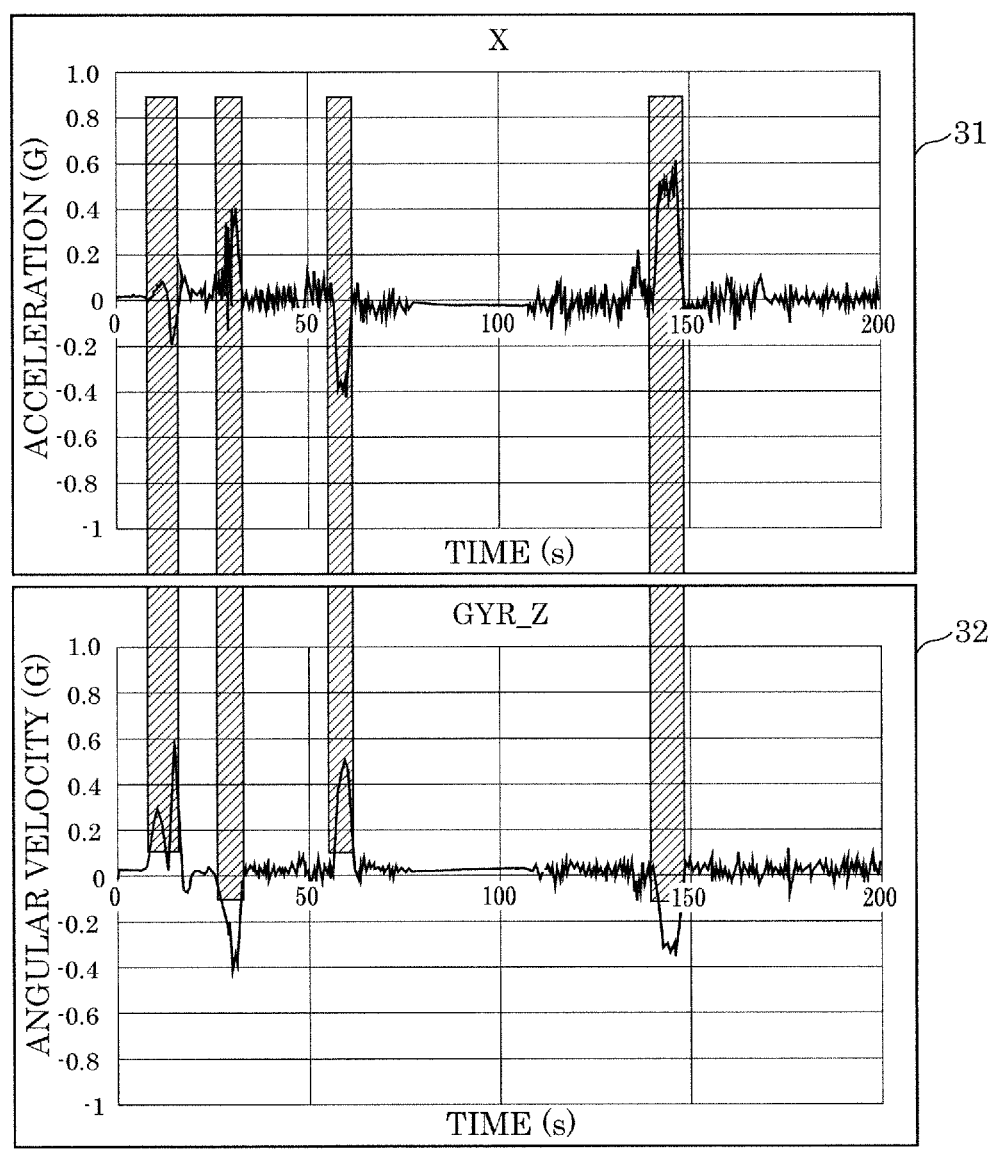
FIG. 13 is a diagram illustrating an example of left-right acceleration data and angular velocity data obtained during constant-velocity traveling on a winding road.

FIG. 13 is a diagram illustrating an example of left-right acceleration data 31 and angular velocity data 32 obtained during constant-velocity traveling on a winding road. FIG. 13 shows left-right acceleration data 31 and vertical angular velocity data 32 respectively detected by an acceleration sensor and a gyroscope for approximately 200 seconds during constant-velocity traveling of the car on a winding road. As shown in FIG. 13, left-right acceleration data 31 and angular velocity data 32 are simultaneously obtained.

Figure 14:
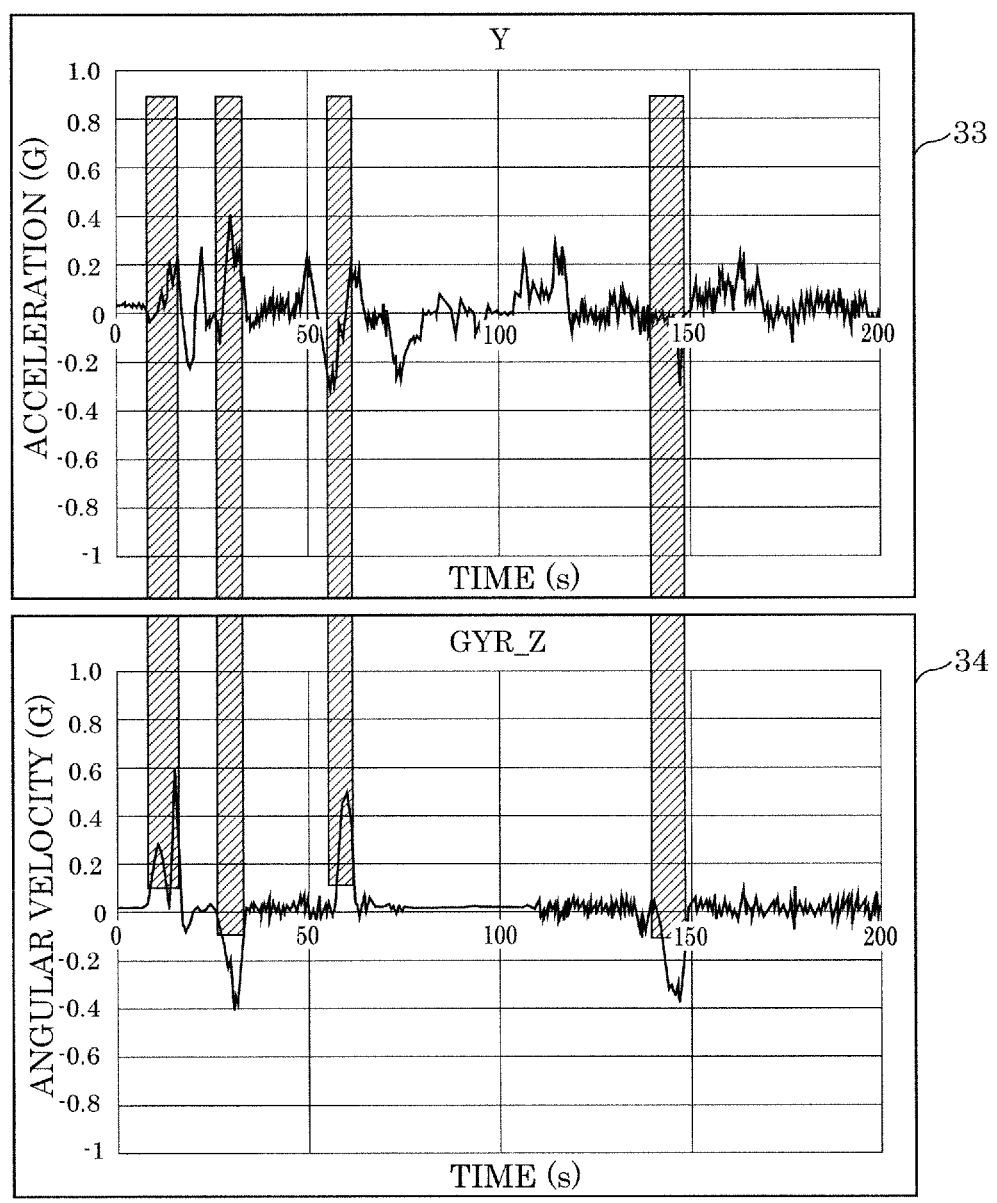
FIG. 14 is a diagram illustrating an example of front-back acceleration data and angular velocity data obtained during constant-velocity traveling on a winding road.

FIG. 14 is a diagram illustrating an example of front-back acceleration data 33 and angular velocity data 34 obtained during constant-velocity traveling on a winding road. FIG. 14 also shows front-back acceleration data 33 and vertical angular velocity data 34 respectively detected by the acceleration sensor and the gyroscope for approximately 200 seconds during constant-velocity traveling of the car on a winding road. As shown in FIG. 14, front-back acceleration data 33 and angular velocity data 34 are simultaneously obtained.

The hatched areas in FIG. 13 and FIG. 14 each indicate a time when vertical angular velocity occurs. The occurrence of the vertical angular velocity means the occurrence of lateral G to the car in cornering.

When the hatched areas in FIG. 13 and FIG. 14 are not used, and areas indicating traveling except cornering can be used, the movement characteristics in which the variance of the front-back acceleration is greater than the variance of the left-right acceleration are satisfied. Accordingly, cornering periods (the hatched areas in FIG. 13 and FIG. 14) may be determined from the angular velocity data simultaneously obtained together with the acceleration data, and traveling periods determined from the acceleration data may not be used. As a result, the movement characteristics in which the variance of the front-back acceleration is greater than the variance of the left-right acceleration can be used, and thus it is possible to identify an orientation of device 1.

Identification unit 12 in Variation 1 first determines a gravitational acceleration direction obtained from acceleration data as a downward direction of an up-down direction of moving body 2, according to the movement characteristics of moving body 2. Next, identification unit 12 determines cornering periods (the hatched areas in FIG. 13 and FIG. 14) from angular velocity data, and subtracts data obtained for the determined cornering periods from the angular velocity data simultaneously obtained together with the acceleration data. Subsequently, identification unit 12 may determine a front-back direction of moving body 2 from variance of horizontal acceleration obtained from the acceleration data after the subtraction, and may determine a back direction of the front-back direction of moving body 2 from the gravity center of the horizontal acceleration, according to the movement characteristics. It should be noted that the angular velocity data may be obtained from, for example, a gyroscope included in device 1.

As described above, identification unit 12 in Variation 1 may subtract the data obtained for the cornering periods from the certain amount of acceleration data obtained by obtainment unit 11. Then, identification unit 12 in Variation 1 may identify the orientation of device 1 expressed in the moving body coordinate system from the certain amount of acceleration data from which the data obtained for the cornering periods have been subtracted, using the known movement characteristics during movement of moving body 2.

In consequence, identification unit 12 can identify the orientation of device 1 expressed in the moving body coordinate system from the certain amount of the acceleration data obtained by obtainment unit 11, using the known movement characteristics during movement of moving body 2, even when moving body 2 is traveling on a winding road at constant velocity.

Variation 2

It is described in Embodiment 1 that moving body 2 is a vehicle, such as a car, and has the movement characteristics in which the movement in the horizontal attitude is dominant relative to the gravitational acceleration direction and the variance characteristics of acceleration during movement are known. The present disclosure, however, is not limited to this. Moving body 2 may be a drone, a robot, etc., and the orientation identification method of the present disclosure can be applied to moving body 2. Hereinafter, this will be described in detail.

When moving body 2 is, for example, a drone or a robot, it cannot be said that moving body 2 has movement characteristics in which movement in the horizontal attitude is dominant relative to a gravitational acceleration direction and variance characteristics of acceleration during movement are known.

As described in the above embodiment, however, orientation identification system 10 can identify an orientation of device 1 when using a certain amount of acceleration data, such as data obtained for approximately five minutes. From this, it is clear that even when moving body 2 is, for example, the drone or the robot, moving body 2 may be caused to perform a movement (hereinafter referred to as a calibration movement) for obtaining a certain amount of acceleration data that satisfies the above movement characteristics in order to identify the orientation of device 1.

In other words, as the calibration movement performed by moving body 2, any movement will do that allow obtainment of an amount of acceleration data that enables identification of the orientation of device 1, that is, acceleration data in which variance of front-back acceleration is great and which enable identification of the front-back direction. More specifically, when moving body 2 is other than a vehicle, moving body 2 may be caused to perform the calibration movement in which an acceleration, a forward movement, and a stop are performed at least once in a state in which moving body 2 is caused to take the horizontal attitude in which the downward direction of moving body 2 corresponds to the gravitational acceleration direction.

After moving body 2 is caused to perform such a calibration movement, obtainment unit 11 may obtain the acceleration of moving body 2 when the calibration movement is performed. Consequently, identification unit 12 can identify the orientation of device 1 from the acceleration data indicating the acceleration of moving body 2 obtained by obtainment unit 11 when the calibration movement is performed, according to characteristics indicated by statistics of the acceleration when the calibration movement is performed, as the movement characteristics.

Advantageous Effects Etc

As described above, by causing moving body 2 to perform a calibration movement, orientation identification system in Variation 2 can obtain acceleration data in which variance of front-back acceleration is great and which enable identification of the front-back direction. Accordingly, even when moving body 2 is other than a wheeled vehicle, orientation identification system in Variation 2 can identify an orientation of device 1 from the acceleration data indicating the acceleration of moving body 2 when the calibration movement is performed.

As above, with the orientation identification method etc. according to the present disclosure, it is possible to identify an orientation of device 1 using only acceleration data detected by an acceleration sensor included in device 1 installed in moving body 2.

Possibility of Other Embodiments

Although the orientation identification method and the recording medium of the present disclosure have been described in the embodiment, main bodies or devices that perform respective processes are not particularly limited.

For example, a processor (to be described below) included in a specific device locally disposed may perform the processes. In addition, for example, a cloud server in a location different from the location of the local device may perform the processes.

It should be noted that the present disclosure is not limited to the aforementioned embodiment. For example, another embodiment realized by optionally combining the structural components described in this Specification or excluding some of the structural components may be included as an embodiment of the present disclosure. Furthermore, variations obtained by various modifications to the aforementioned embodiment that can be conceived by a person skilled in the art, that are within the scope of the essence of the present disclosure, that is, the intended teachings of the recitations of the claims, are also included in the present disclosure.

In addition, the present disclosure further includes the following cases.

(1) Each of the devices described above is specifically a computer system made up of a microprocessor, a ROM, a RAM, a hard disk unit, a display unit, a keyboard, a mouse, and so on. The RAM or the hard disk unit stores a computer program. The operation of the microprocessor according to the computer program allows each of the devices to perform a function. Here, the computer program includes a combination of instruction codes to the computer so that the computer performs predetermined functions.

(2) Part or all of the structural components included in each of the devices described above may be a single system Large Scale Integration (LSI). The system LSI is a super-multifunctional LSI manufactured by integrating constituent units on a single chip, and is specifically a computer system including a microprocessor, a ROM, a RAM, and so on. The RAM stores a computer program. The operation of the microprocessor according to the computer program allows the system LSI to perform a function.

(3) All or part of the structural components included in each of the devices described above may be an IC card or a standalone module attachable to the device. The IC card or the module is a computer system including a microprocessor, a ROM, a RAM, and so on. The IC card or the module may include the above-described super-multifunctional LSI. The operation of the microprocessor according to a computer program allows the IC card or the module to perform a function. The IC card or the module may be tamper-resistant.

(4) The present disclosure may be the method described above. Moreover, the present disclosure may be a computer program for performing the method, using a computer, and may also be a digital signal including the computer program.

(5) Furthermore, the present disclosure may be the above-described computer program or digital signal recorded on a computer-readable recording medium, such as a flexibly disk, a hard disk, a CD-ROM, an MO, a DVD, a DVD-ROM, a DVD-RAM, a Blu-ray Disc (BD) (registered trademark), or a semiconductor memory. In addition, the present disclosure may be the above-described digital signal recorded on these recording mediums.

Moreover, the present disclosure may be the above-described computer program or digital signal transmitted via an electric telecommunication line, a wireless or wired communication line, a network typified by the Internet, data broad cast, and so on.

Furthermore, the present disclosure may be a computer system including a microprocessor and a memory. The memory may store the above-described computer program, and the microprocessor may operate according to the computer program.

Moreover, by transferring the above-described recording medium having the above-described computer program or digital signal recorded thereon or by transferring the above-described computer program or digital signal via the above-described network or the like, the present disclosure may be implemented by a different independent computer system.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to orientation identification methods and recording mediums for identifying the orientation of a device using only acceleration data detected by an acceleration sensor of the device mounted on a moving body so that data having an output value that varies in accordance with the mounting orientation of the device, such as acceleration data or angular velocity data, are effectively used.

What is claimed is:

1. An orientation identification method for identifying an orientation of a device installed by being mounted on a moving body, the orientation identification method comprising:
    obtaining a certain amount of acceleration in three mutually orthogonal directions detected by an acceleration sensor included in the device; and
    identifying the orientation of the device expressed in a coordinate system from acceleration data indicating the certain amount of acceleration obtained in the obtaining, according to movement characteristics indicated by statistics that includes variance of acceleration during movement of the moving body expressed in the coordinate system, and is obtained from the acceleration, the coordinate system including a gravitational acceleration direction as an axis.

2. The orientation identification method according to claim 1,
    wherein the moving body is a wheeled vehicle, and
    the movement characteristics indicate that a movement in a state in which a downward direction of an up-down direction of the moving body is the gravitational acceleration direction is dominant, variance of acceleration in a front-back direction of the moving body is greater than variance of acceleration in a left-right direction of the moving body, and a density distribution of acceleration in a back direction of the moving body is greater than a density distribution of acceleration in a front direction of the moving body, the front-back direction including a movement direction of the moving body and an opposite direction of the movement direction, the left-right direction crossing the front-back direction.

3. The orientation identification method according to claim 1,
    wherein the identifying includes:
        a first step of determining the gravitational acceleration direction obtained from the acceleration data as a downward direction of an up-down direction of the moving body, according to the movement characteristics; and a second step of determining a front-back direction of the moving body from the gravitational acceleration direction obtained from the acceleration data and variance of acceleration in a vertical direction, and determining a back direction of the front-back direction from a gravity center of the variance of acceleration in the vertical direction, according to the movement characteristics, the front-back direction including a movement direction of the moving body and an opposite direction of the movement direction.

4. The orientation identification method according to claim 3, wherein the first step includes:

extracting second acceleration data having a norm that is approximately 1 G from first acceleration data indicating the certain amount of acceleration obtained in the obtaining; and applying a rotation matrix to the first acceleration data so that a direction of an average vector of the extracted second acceleration data is the gravitational acceleration direction, the rotation matrix causing the direction of the average vector to be a negative direction of a Z-axis of the coordinate system.

5. The orientation identification method according to claim 4, wherein the second step includes:

calculating two eigenvalues and two eigenvectors from the first acceleration data to which the rotation matrix has been applied in the applying;

a first determination step of determining, as the front-back direction, a direction of one of the two eigenvectors corresponding to a larger one of the two eigenvalues calculated in the calculating, the direction of the one of the two eigenvectors being a direction on an xy-plane that is a vertical direction relative to the Z-axis; and a second determination step of determining a direction of the front-back direction determined in the first determination step as the back direction of the front-back direction, the direction being a direction in which a gravity center of the first acceleration data, to which the rotation matrix has been applied, on the xy-plane is displaced from an origin of the xy-plane.

6. The orientation identification method according to claim 1, further comprising:

registering a mounting angle of the device that indicates the orientation of the device identified in the identifying and is expressed in the coordinate system; and converting coordinates of at least one of acceleration data and angular velocity data obtained by the device, using the mounting angle registered in the registering.

7. The orientation identification method according to claim 6, further comprising:

when the obtaining and the identifying are newly performed after the converting, determining whether the mounting angle registered in the registering is to be updated; and when the mounting angle registered in the registering is determined to be updated in the determining, updating the mounting angle registered in the registering to a mounting angle of the device that indicates an orientation of the device identified in the identifying newly performed and is expressed in the coordinate system.

8. The orientation identification method according to claim 7, wherein in the determining, whether the mounting angle registered in the registering is to be updated is determined according to whether a difference between the mounting angle of the device that indicates the orientation of the device identified in the identifying newly performed after the converting and is expressed in the coordinate system and the mounting angle registered in the registering is greater than or equal to a threshold value.

9. The orientation identification method according to claim 1, wherein in the obtaining, the acceleration detected by the acceleration sensor while the moving body is moving over a predetermined distance is obtained as the certain amount of acceleration.

10. The orientation identification method according to claim 1, wherein in the obtaining, the acceleration detected by the acceleration sensor while the moving body is moving for a predetermined time is obtained as the certain amount of acceleration.

11. The orientation identification method according to claim 1, further comprising:

when the moving body is other than a wheeled vehicle, performing a calibration movement in which an acceleration, a forward movement, and a stop are performed at least once in a state in which the moving body is caused to take a horizontal attitude in which a downward direction of the moving body corresponds to the gravitational acceleration direction, wherein in the obtaining, acceleration of the moving body is obtained when the performing is performed, and in the identifying, the orientation of the device is identified from acceleration data indicating the acceleration of the moving body obtained in the obtaining when the performing is performed, according to characteristics indicated by statistics of the acceleration of the moving body obtained when the performing is performed, as the movement characteristics.

12. A non-transitory computer-readable recording medium for use in a computer, the recording medium having a computer program recorded thereon for causing the computer to execute an orientation identification method for identifying an orientation of a device installed by being mounted on a moving body, the orientation identification method including:

obtaining a certain amount of acceleration in three mutually orthogonal directions detected by an acceleration sensor included in the device; and identifying the orientation of the device expressed in a coordinate system from acceleration data indicating the certain amount of acceleration obtained in the obtaining, according to movement characteristics indicated by statistics that includes variance of acceleration during movement of the moving body expressed in the coordinate system, and is obtained from the acceleration, the coordinate system including a gravitational acceleration direction as an axis.

* * * * *